United States Patent [19]

Hoenke

[11] 3,954,929

[45] May 4, 1976

[54] METHOD AND APPARATUS FOR THE EXTRUSION OF FOAMABLE THERMOPLASTIC MATERIALS

[75] Inventor: Guy A. Hoenke, Ironton, Ohio

[73] Assignee: The Dow Chemical Company, Midland, Mich.

[22] Filed: Apr. 24, 1975

[21] Appl. No.: 571,657

Related U.S. Application Data

[63] Continuation-in-part of Ser. No. 405,339, Oct. 11, 1973, abandoned.

[52] U.S. Cl. ............................ 264/51; 264/45.5; 264/46.1; 264/88; 264/177 R; 425/325
[51] Int. Cl.² .................................... B29D 27/00
[58] Field of Search ............... 264/51, 53, 37, 48, 264/88, 45.5, 46.1, 177 R; 425/325

[56] References Cited

UNITED STATES PATENTS

| | | | |
|---|---|---|---|
| 2,537,977 | 1/1951 | Dulmage | 264/53 |
| 2,620,515 | 12/1952 | Olson | 264/88 |
| 2,774,991 | 12/1956 | McCurdy et al. | 264/53 |
| 3,194,854 | 7/1965 | Smith | 264/53 |
| 3,219,733 | 11/1965 | Harris et al. | 264/48 |
| 3,413,388 | 11/1968 | Lux et al. | 264/46.1 |
| 3,431,163 | 3/1969 | Gilbert | 264/48 X |
| 3,466,705 | 9/1969 | Richie | 264/53 X |
| 3,647,329 | 3/1972 | Reifenhauser et al. | 264/54 X |
| 3,764,642 | 10/1973 | Boutillier | 264/48 X |

FOREIGN PATENTS OR APPLICATIONS

| | | | |
|---|---|---|---|
| 451,864 | 10/1948 | Canada | 264/53 |
| 1,411,467 | 8/1965 | France | 264/53 |
| 2,063,589 | 6/1971 | France | 264/48 |

Primary Examiner—Philip Anderson
Attorney, Agent, or Firm—Robert B. Ingraham

[57] ABSTRACT

Plastic foam is extruded into and from a channel where it expands from an extrusion orifice. A pressure controlled gas pocket provides support for the foaming material generally adjacent the extrusion die. The arrangement permits extrusion of foam having widely varying characteristics with a single apparatus.

4 Claims, 4 Drawing Figures

METHOD AND APPARATUS FOR THE EXTRUSION OF FOAMABLE THERMOPLASTIC MATERIALS

This application is a continuation-in-part of my copending application Ser. No. 405,339, filed Oct. 11, 1973 and now abandoned.

Foamed plastics are well known times of commerce. Particularly desirable forms of foam plastics are those having rectangular or other regular configurations which are suitable for structural purposes such as insulation. Beneficially such foamed plastics are employed as panel cores, building insulation as well as for decorative purposes such as for supports for floral arrangements. Many foams have a relatively low density usually from about 1.5 to about 3 pounds per cubic foot and are prepared by extruding a heat plastified mixture of a thermoplastic resin and a blowing agent. Such foamable plastic systems are well known in the art and some are set forth in the following U.S. Pat. Nos.: 2,387,730; 2,409,910; 2,515,250; 2,537,977; 2,576,911; 2,620,515; 2,669,751; 2,774,991; 2,857,625; 2,884,386; 2,928,130; 3,121,130; 3,121,911; 3,194,854; 3,219,733; 3,299,192; 3,431,163; 3,431,164; 3,466,705 and 3,764,642, the teachings of which are herewith incorporated by reference. The extrusion of plastic foams with the passage of time has become more sophisticated in order that the extruded product might have physical characteristics suitable for a specific application. It is particularly desirable in the extrusion of foamed plastics that the cooled foam have a shape and size of the desired end product thus avoiding loss of material by trimming, shaping and the like. Therefore, it is desirable to extrude foam in such a way that such trim waste is minimized and to this end the various extrude shaping devices have been employed. The physical properties of the resultant foam can be varied quite significantly by such factors as the relative speed of extrusion and takeaway speed which affects cell orientation. For many applications it has been found desirable to provide shaping plates generally adjacent the extrusion die. Such shaping plates have varied from flat plates which are hinged adjacent the die to elaborately curved plates which conform more or less to the natural configuration of the expanding foam. In some instances such plates have been replaced by a plurality of rolls. Such shaping aids are intended to provide a finished product having a generally rectangular or other predetermined configuration and hopefully a generally uniform density throughout the extruded shape. One can, with time and patience, devise a curved shaping plate which aids in obtaining the desired physical characteristics in the extruded product. However, such a shaping plate generally is satisfactory for only a single product and/or a narrow range of operating conditions and when a different product or different operating conditions are desired two or more new shaping plates must be developed.

It would be desirable if there were available an improved method and apparatus for the extrusion of expandable synthetic resinous foams which could support the expanding extruded foam without the necessity of individual shaping plates for each product extruded.

It would also be desirable if there were available an improved and simplified plastic foam extrusion apparatus.

It would further be desirable if there were available an improved plastic foam extrusion method.

These benefits and other advantages in accordance with the present invention are achieved in a process for the preparation of synthetic resinous thermoplastic foam, the steps of the method comprising providing a heat plastified synthetic resinous thermoplastc extrudable foamable composition, extruding the composition through an extrusion orifice into a channel of lower pressure, the channel having a cross-sectional configuration generally corresponding to the shape of the product desired, the extrudable composition expanding to generally fill the cross section of the channel adjacent a discharge end thereof and withdrawing foamed composition from the channel at a location remote from the extrusion orifice, the improvement which comprises providing within the channel, at a location adjacent to the orifice, a gas under pressure, the gas pressure being sufficient to regulate the shape of the expanding composition at a location between the orifice and a location where the expandng composition contacts the chamber walls.

Also contemplated within the scope of the present invention is an extrusion apparatus, the extrusion apparatus comprising a source of heat plastified synthetic resinous thermoplastic foamable extrudable composition, an extrusion die having a die orifice, the die orifice being in full communication with the source, a hollow channel in communication with the die, the channel having a discharge orifice communicating with the die and remotely disposed therefrom, a gas source in operative communication with the channel at a location generally adjacent the die, and means to control the pressure of gas to the channel.

Further features and advantages of the present invention will become more apparent from the following specification taken in connection with the drawing wherein.

Figure 1:
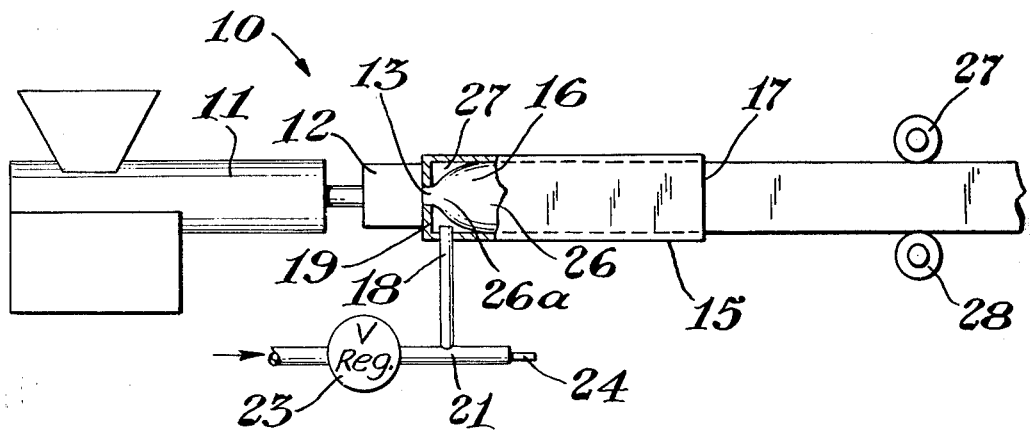
FIG. 1 is a schematic representation of a side view of apparatus in accordance with the invention.

In FIG. 1 there is schematically depicted an apparatus indicated by the reference numeral 10. The apparatus 10 comprises in cooperative combination a source 11 such as a plastics extruder which provides a heat plastified stream of a synthetic resinous thermoplastic extrudable foamable composition. The extruder 11 is in operative combination with a die 12. The die 12 has an extrusion orifice 13 having a generally slot-like configuration. The slot 13 is in full communication with a hollow housing 15. The housing 15 defines therein a space, channel or shaping passage 16. The housing 15 has a discharge opening 17 remotely disposed from the die orifice 13. As depicted in FIG. 1, the space 16 within the housing 15 has a desired configuration; that is, rectangular. A conduit 18 is in operative combination with the space 16 at a location 19 generally adjacent the die 12. The conduit 18 is in communication with a conduit 21 which in turn communicates with a gas pressure regulating valve 23 and a discharge nozzle or bleed 24. Disposed within the space 16 is an expanded extruded synthetic resinous composition or foam 26 which fills the cross-section of the space 16 adjacent the discharge opening 17 thereof. The foam 26 is in contact with a major portion of the internal walls of the housing 15 and is shaped thereby. A gas space 27 surrounds an extrudable foamable composition 26a at a location where the composition is foaming which is generally adjacent to the extrusion orifice 13. The gas space 27 is defined by the housing and foam 26a and 26. The extrudable composition 26a expands or foams to form foam 26. The foam 26 remote from the orifice 15 peripherally engages the inner wall of the housing 15 which series retains gas in the space 27. Remote from the chamber 15 generally adjacent the opening 17 are takeaway rolls or conveying means 27 and 28.

Figure 2:
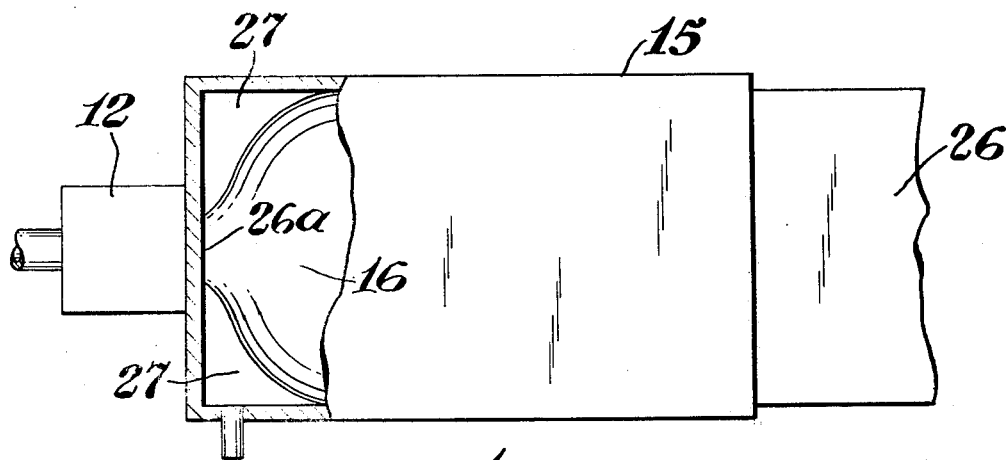
FIG. 2 is a partially cutaway fractional view of a portion of the apparatus of FIG. 2.

In FIG. 2 there is shown a fractional, partially-cutaway view of the chamber 15 of FIG. 1 viewed along the line 2—2 of FIG. 1 more clearly showing the general configuration of the extrude 26a as the extrude 26a leaves the extrusion orifice and expands into the foam 26.

In operation of the apparatus as depicted in FIGS. 1 and 2, extrudable foamable composition is extruded from the orifice 13, expands to form the foam 26 and is removed by the takeaway means 27 and 28. The gas pressure regulating assembly consisting of components 18, 21, 23 and 24 is adjusted by means of the valve 23 to provide a gas pressure within the space 27 sufficient to permit either rapid expansion or delayed expansion of the composition 26a as desired and provide the desired characterisitcs in the extruded foam. For example, if cells are desired which are elongated generally in directions normal to the direction of extrusion, a relatively low gas pressure is employed, whereas if orientation is desired in the direction of extrusion, a higher gas pressure is used. The gas pressure tends to advance the foam from the chamber and overcome frictional drag forces developed by contact of the foam with the chamber walls. The particular pressure in the chamber will vary from composition to composition the characteristics desired in the foam. The gas pressure usually will be within the range of from about 1 to 15 pounds per square inch gauge. The temperature of the supply gas is usually immaterial as the heat capacity and volume of the gas is small relative to the extrude and the volume.

Figure 3:
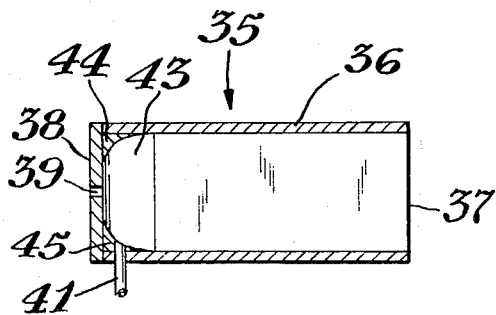
FIG. 3 is an alternate embodiment of a channel for the apparatus of FIG. 1.

In FIG. 3 there is schematically depicted an alternate chamber suitable for use in the present invention designated by the reference numeral 35. The chamber 35 comprises an outer housing 36 which has an open end 37, a closed end 38 having defined therein an extrusion orifice 39. A gas conduit 41 provides communication between the inside of the chamber and space external thereto. A side shaped fillet 43 is positioned in a corner of the housing generally adjacent to the slot 39. An upper shaped fillet 44 and a lower shaped fillet 45 are similarly disposed within corners of the housing. A fourth side shaped fillet is disposed opposite the fillet 43 but is not shown. The arrangements of the fillets within the chamber 35 adjacent the extrusion slot provides a convenience in startup of extrusion by eliminating sharp corners in which initially extruded foam may adhere prior to the extrusion of sufficient foam material into the chamber to provide a cell which would permit gas pressure to increase to a sufficient extent to shape the expanding portion of the extrude. The fillets 43, 44, 45 and the fourth side fillet (not shown) do not contact the foam when steady state operation is achieved. Optionally, the side fillets may, if desired, be increased in size to contact the extruded foam at the rearmost edge portion and gas pressure support applied to only the major faces of the expandng composition.

Figure 4:
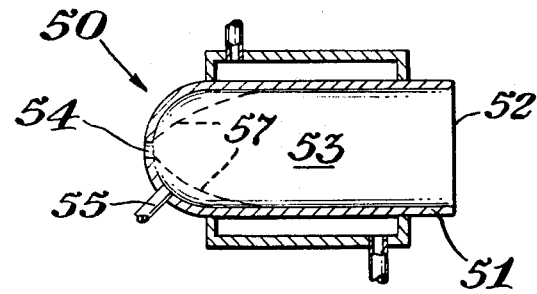
FIG. 4 shows a channel suitable for the peparation of a foam having a circular cross-section.

In FIG. 4 there is depicted a sectional view of a chamber suitable for the practice of the present invention generally designated by the reference numeral 50. The chamber 50 has a jacketed housing 51. The housing 51 has an open end 52, an internal passageway 53 and a feed end or slot 54 remotely disposed from the open end 52. The housing 51 has defined therein a generally cylindrical passage which smoothly curves in a concave manner to the orifice 54. The conduit 55 is in communication with a source of pressure regulated gas, not shown. Dotted lines indicated by the reference numeral 57 depict the shape of an extruded foam composition within the chamber when a cylindrical billet is being extruded. The housing may be heated, cooled or operated at ambient temperature dependng upon the surface effects desired in accord with conventional foam extrusion practices.

Apparatus as depicted in FIGS. 1–4 is eminently satisfactory for the preparation of extruded thermoplastic foams including polystyrene, polyvinyl chloride, polyethylene, polypropylene and the like. Rectangular, hexagonal and circular shapes are readily prepared in a manner to give substantial control of cell orientation.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. In a process for the preparation of synthetic resinous thermoplastic foam, the steps of the method comprising providing a heat plastified synthetic resinous thermoplastic extrudable foamable composition, extruding the composition through an extrusion orifice into a shaping channel of lower pressure, said channel having internal walls, the channel having a cross-sectional configuration generally corresponding to the shape of the product desired, the extrudable composition expanding to generally fill said channel and contact said channel walls at a location adjacent a discharge opening thereof and withdrawing the foamed product from said channel at the discharge opening remote from the extrusion orifice, the improvement which comprises providing within said channel, at a location adjacent to the die, a gas under pressure, the gas pressure being sufficient to regulate the shape of the expanding composition at a location between the die and a location where the expanding composition contacts said channel walls.

2. The process of claim 1 wherein the cross-sectional configuration is an elongate rectangle.

3. The process of claim 2 including the step of mechanically supporting edge portions of the expandable composition during expansion.

4. The process of claim 1 wherein the cross-sectional configuration is circular.

* * * * *